US005611407A

United States Patent [19]
Maehara et al.

[11] Patent Number: 5,611,407
[45] Date of Patent: Mar. 18, 1997

[54] DRIVING FORCE DISTRIBUTION CONTROL SYSTEM FOR FOUR WHEEL DRIVE VEHICLE

[75] Inventors: Katsumi Maehara, Yokosuka; Hiroshi Ohkuma, Yokohama, both of Japan

[73] Assignee: NABCO Limited, Kobe, Japan

[21] Appl. No.: 349,974

[22] Filed: Dec. 6, 1994

[30] Foreign Application Priority Data

Dec. 14, 1993 [JP] Japan .................................... 5-342582
Nov. 12, 1994 [JP] Japan .................................... 6-303213

[51] Int. Cl.$^6$ ................................................. B60K 17/35
[52] U.S. Cl. .......................................... 180/249; 180/248
[58] Field of Search .................................... 180/233, 244, 180/248, 249; 192/86, 103 F

[56] References Cited

U.S. PATENT DOCUMENTS

| | | | |
|---|---|---|---|
| 4,928,494 | 5/1990 | Glamm | 62/222 |
| 5,009,294 | 4/1991 | Ghoneim | 192/1.22 |
| 5,011,237 | 4/1991 | Matouka et al. | 303/115 |
| 5,127,315 | 7/1992 | Gerard et al. | 93/13 |
| 5,184,877 | 2/1993 | Miyakawa | 303/113.2 |
| 5,207,488 | 5/1993 | Newton et al. | 303/115.2 |
| 5,259,476 | 11/1993 | Matsuno et al. | 180/248 |
| 5,418,725 | 5/1995 | Eto | 180/248 |
| 5,497,333 | 3/1996 | Sasaki | 180/248 |

FOREIGN PATENT DOCUMENTS 2104177  3/1983  United Kingdom.

OTHER PUBLICATIONS

European Search Report of counterpart EP 94 30 9262.

*Primary Examiner*—Anne Marie Boehler
*Attorney, Agent, or Firm*—Kane, Dalsimer, Sullivan, Kurucz, Levy, Eisele and Richard, LLP

[57] ABSTRACT

It is an object of this invention to make compact a system for controlling the distribution of a driving force and also to simplify its controlling procedure. To achieve this object, a motor 200, 2200 is designed to be electrically controlled, and the rotation of the motor is transformed to the stroke of a plunger 370, 2370 by a hydraulic pressure producing cylinder device 300. By doing this, a hydraulic pressure is produced within a hydraulic pressure chamber 376, 2376 and the hydraulic pressure thus produced is supplied to an operating cylinder 40. The operating cylinder 40 controls a gain of an engagement force of a variable torque clutch device 30. Also, it is another object of the present invention to provide a fail-safe technique for a hydraulic pressure supply device of the motor drive type. In order to achieve this second object, there is further employed a hydraulic pressure compensating device 500, 2500 for supplying, when a failure has occurred disenabling rotation of the motor 200, 2200, a predetermined hydraulic pressure to the operating cylinder 40 in response to the occurrence of the failure and maintain the hydraulic pressure to that level.

12 Claims, 11 Drawing Sheets

DRIVING FORCE DISTRIBUTION CONTROL SYSTEM FOR FOUR WHEEL DRIVE VEHICLE

BACKGROUND OF THE INVENTION

This invention relates to a driving force distribution control technique intended to vary the distribution of driving force to be transmitted from an engine to front and rear wheels in a four wheel drive vehicle. Particularly, it relates to a hydraulic pressure supply device of the motor drive type which is suited to be made compact, and to a fail-safe technique for coping with a failure of the device.

A driving force distribution control technique of this type is intended for improving the safety of driving a vehicle. For example, it is a technique for varying the distribution ratio of a driving force transmitted from the engine such that the driving mode of the vehicle is changed from a completely rear-wheel drive mode to a front-wheel and rear-wheel drive mode at the ratio of 50:50.

In such driving force distribution control technique, there is a provision of a variable torque clutch device, such as a multiple disc clutch, located on that portion of a driving force transmission path leading from the engine to front or rear wheels, so that a magnitude of the driving force to be transmitted (namely, driving force distribution) is varied by controlling a gain of the engagement force of the variable torque clutch device. The means for controlling a gain of a clutch engagement force includes an operating cylinder serving as an actuator, and a hydraulic pressure supply device (or unit) for supplying a hydraulic pressure to the operating cylinder in accordance with a command from outside. Conventionally, a hydraulic pressure supply device generally comprises a pump serving as a hydraulic pressure source, an accumulator which stores, at a predetermined pressure, a fluid which has been discharged from the pump, and a proportional solenoid valve for regulating the hydraulic pressure in the accumulator in accordance with a command from a controller and outputs it to an operating cylinder side. The conventional techniques so far discussed are disclosed, for example, in Japanese Patent Publication No. Hei 4-24253, Japanese Patent Unexamined Publication No. Hei 4-397335, U.S. Pat. No. 4,773,500, or U.S. Pat. No. 4,986,388.

However, those conventional hydraulic pressure control devices have several difficulties in making the control device compact and simplifying the controlling procedure with the use of it. The most serious difficulty among them is as follows. Since a pump and an accumulator are essentially employed, the hydraulic control unit itself becomes large in size and this makes it difficult to fulfill the requirement to make the overall system compact.

SUMMARY OF THE INVENTION

Therefore, taking such problems into consideration, an object of the present invention is firstly to make a system compact and secondly to simplify the controlling procedure of the system.

According to the teaching of this invention, a construction of a hydraulic pressure supply device in the system is newly designed. That is, the hydraulic pressure supply device herein employed comprises a motor, rotation of which is controlled upon receipt of a command from outside, and a hydraulic pressure producing cylinder device for producing a hydraulic pressure by a stroke motion thereof in accordance with rotation of the motor, a hydraulic pressure being supplied from the hydraulic pressure producing cylinder device to a variable torque clutch device. Therefore, according to the present invention, since a hydraulic pressure is produced by transforming a rotational motion of the motor to a stroke motion of a piston, the pump portion is no more required. Consequently, there can be obtained such advantages that the unit can be made compact, the noise can be reduced, and the controlling operation becomes easier.

It is another object of the present invention to provide a fail-safe technique to a new type hydraulic pressure supply device. Should a failure occur disenabling rotation of the motor of the hydraulic pressure supply device, it becomes impossible to effectively distribute the driving force. For example, in a hydraulic pressure supply device of the motor drive type in which a plunger, which has performed a stroke motion in accordance with the rotation of a motor, is retained at a location where a rotational torque produced by the motor is well balanced with a produced hydraulic pressure and a force of a return spring acting against the rotational torque, when a failure of the type mentioned above has occurred, the plunger is returned to the non-operating position while rotating the motor and the hydraulic pressure in the operating cylinder becomes substantially equal to zero thereafter. As a result, the driving force cannot be distributed, and a two-wheel drive mode is created. Also, in another motor drive type hydraulic pressure supply device which is equipped with a clutch mechanism for prohibiting a return stroke of a plunger caused by a produced hydraulic pressure, and which is designed from the standpoint of reducing a load to the motor, the plunger is stopped in an undetermined position during the course of its stroke motion because the motor is not rotated normally and reversely. Consequently, there is the fear that the torque distribution ratio of the front and rear wheels is fixed to the state where it does not match to the traveling condition of the vehicle. The clutch mechanism of the latter type has such a function that even if the supply of electric current to the motor is cut off after the plunger has performed its stroke motion (the motor is receiving the hydraulic pressure produced in accordance with the stroke motion of the plunger), the plunger is prohibited from performing a stroke motion in its returning direction.

Therefore, it is a further object of the present invention to provide a fail-safe technique capable of coping with such accidental failure, specifically by supplying a predetermined hydraulic pressure to the operating cylinder when a failure has occurred disenabling rotation of the motor and maintain the pressure level, so that the torque distribution ratio of the front and rear wheels will be maintained to a predetermined ratio matching to a normal traveling condition of the vehicle.

This invention essentially employs, as a hydraulic pressure supply device for supplying a hydraulic pressure to the operating cylinder, a motor drive type device which includes a motor, rotation of which is controlled in accordance with a command from outside, and in which the rotation of the motor is transformed to a stroke motion of a plunger to produce a hydraulic pressure.

The present invention further comprises a hydraulic pressure compensating device for supplying, when a failure has occurred for disenabling rotation of the motor of the hydraulic pressure supply device, a predetermined hydraulic pressure to the operating cylinder in response to the occurrence of the failure, so that the pressure will be maintained to the predetermined level.

The motor is an electrical motor such as a stepping motor or a DC motor. The failure of the type disenabling rotation of the motor generally refers to a failure of the type in which an electric current cannot be supplied to the motor due to wire cutting, etc. However, the term "failure" used herein is not limited to the above-mentioned type but also includes a failure of the type in which an electric current can be supplied to the motor but the motor is unable to rotate in spite of the supply of electric current (for example, a failure in rotational mechanism of the motor, or a failure in mechanical transmission mechanism disposed next to the rotational mechanism of the motor). As for the electrical failure first mentioned, an electronic controller for controlling the distribution of a driving force can be used for the detection of such failure, while as for the failure last mentioned, there may be employed, for example, a hydraulic pressure sensor for detecting the hydraulic pressure in a hydraulic pressure chamber of the hydraulic pressure supply device, so that the failure will be detected by the electronic controller in accordance with a detection signal coming from the hydraulic pressure sensor.

The hydraulic pressure compensating device may be connected to the hydraulic pressure supply device in serial or parallel relation.

The hydraulic pressure compensating device comprises a pressure cylinder including a piston defining a pressure chamber, and a control means for sending a control signal to the pressure cylinder. One preferred example of the pressure cylinder is a solenoid cylinder including an electromagnetic drive portion and capable of moving the piston by an electromagnetic force. The reason is that the electronic controller can be used as a means for controlling the solenoid cylinder. In addition, as the pressure cylinder, there may be employed one in which a vacuum source such as an intake manifold of an engine is used, that is, of the type in which the piston is moved depending on whether there is a differential pressure between the vacuum source and the atmosphere.

Attached to the pressure cylinder is a spring for biasing the piston toward the hydraulic pressure chamber side. Due to an electromagnetic force produced by the electromagnetic drive portion, or the differential pressure between the vacuum source and the atmosphere, the piston is normally in the non-operating position where the hydraulic pressure chamber becomes large in volume. Therefore, the means for producing such electromagnetic force or differential pressure can be said as a means for holding the piston in the non-operating position. However, when the failure occurs, the electromagnetic force or differential pressure disappears and the piston is moved a predetermined amount toward the hydraulic pressure chamber side by the biasing force of the spring. By this, a predetermined driving force distribution can be carried out even when a failure should occur.

DESCRIPTION OF THE PREFERRED EMBODIMENTS

[DRIVE FORCE DISTRIBUTION TECHNIQUE]

Figure 1:
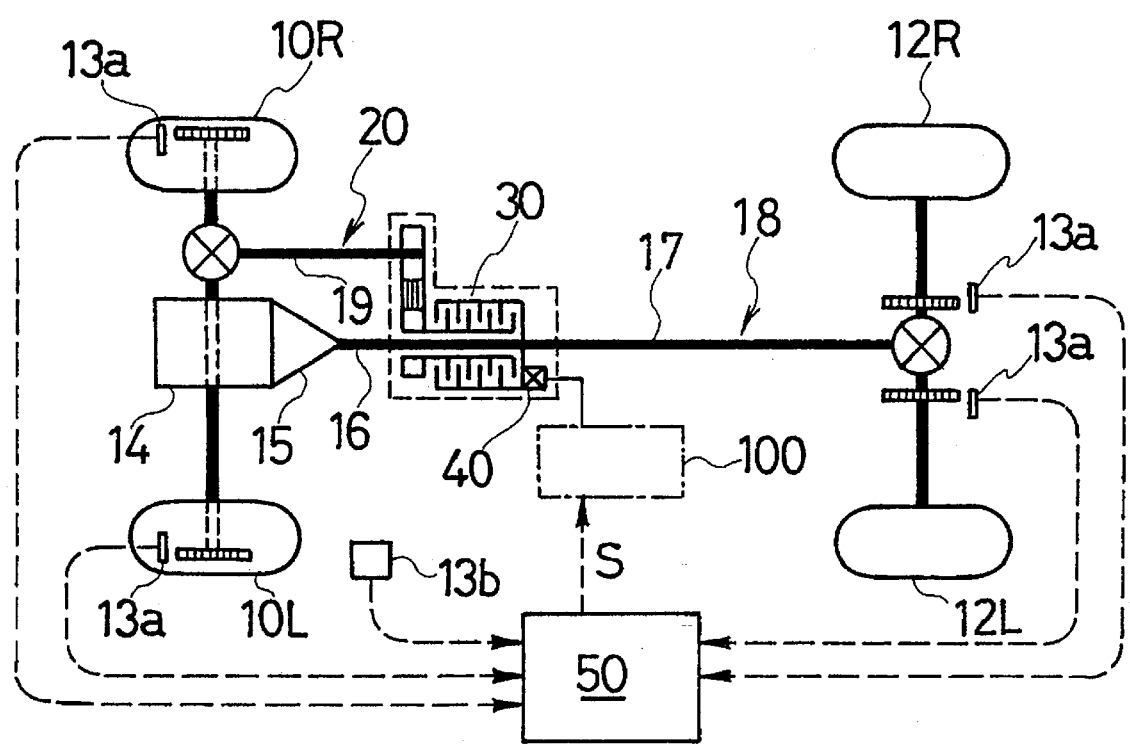
FIG. 1 is a schematic view showing a construction of an overall system of the present invention.

Referring first to FIG. 1, a construction of an overall system of a drive force distribution technique of the present invention, and the location, in the overall system, of a hydraulic pressure supply device which is concerned with the problem of a failure for disenabling rotation of a motor, will be described in detail. This system can be applied to a four wheel drive vehicle of a rear wheel drive base or front wheel drive base. FIG. 1 shows an example in which the system is applied to a four wheel drive vehicle of a rear wheel drive base, which has a front left wheel 10L, a front right wheel 10R, a rear left wheel 12L, and a rear right wheel 12R. A driving force of an engine 14 is transmitted directly to the rear wheels 12L and 12R via a rear driving force transmission line or path 18 including a transmission 15, an input shaft 16, a rear propeller shaft 17, etc. On the other hand, the driving force of the engine 14 is transmitted indirectly to the front wheels through a variable torque clutch device 30 which comprises a multiple disc plates. The clutch device 30 is located on the front drive force transmission path 20 between the input shaft 16 disposed next to the transmission 15 and a front propeller shaft 19. This variable torque clutch device 30 varies a gain of the clutch engagement force in accordance with the operation of an operating cylinder 40, thereby varying the driving force distribution of the front and rear wheels 10L, 10R; 12L, 12R.

[HYDRAULIC PRESSURE SUPPLY DEVICE]

A hydraulic pressure supply device 100 is a hydraulic pressure unit which supplies an appropriate hydraulic pressure to the operating cylinder 40. This hydraulic pressure supply device 100 has the function for controlling the hydraulic pressure to be supplied, upon receipt of a command S from the controller 50. Input signals to the controller 50 include, but are not limited to, those coming from a vehicle wheel speed sensor 13*a* for detecting the number of rotations of the respective wheels, and a G sensor 13*b* for detecting the speed of vehicle body. Upon receipt of those signals, the controller 50 sends such control signal (command) S as being able to obtain a driving force distribution matching to the conditions of the vehicle.

Figure 2:
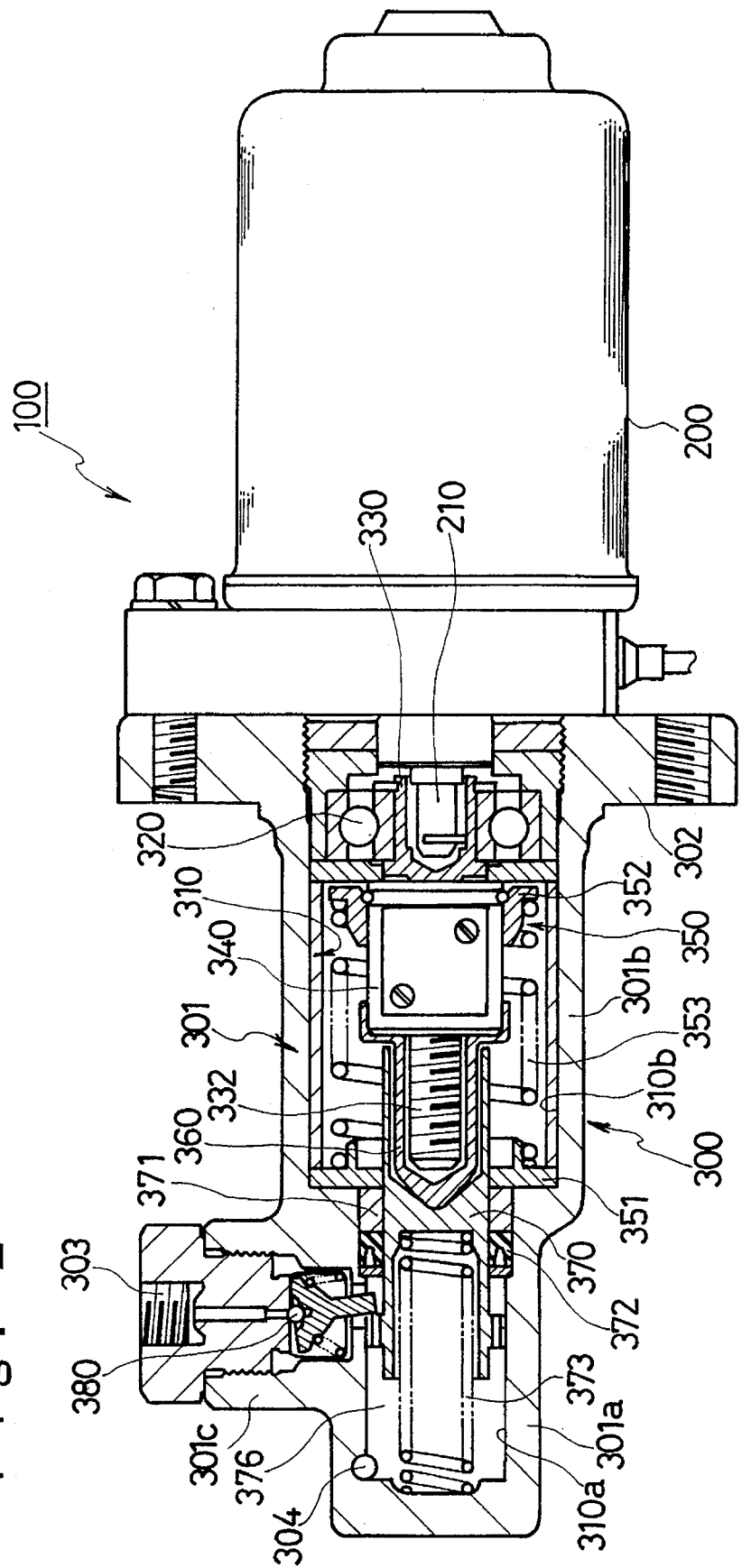
FIG. 2 is a sectional view of a construction showing one example of a hydraulic pressure supply device to be employed in the present invention.

The hydraulic pressure supply device 100 will now be described with reference to FIG. 2. The hydraulic pressure supply device 100 basically includes a motor 200, rotation of which is controlled upon receipt of a command S from the controller 50, and a hydraulic pressure producing cylinder device 300 for producing a hydraulic pressure by a stroke motion thereof in accordance with rotation of the motor 200. A cylinder body 301 of the cylinder device 300, this cylinder body 301 being opened at one end thereof, is provided at the opening portion thereof with a flange 302. This flange 302 is adapted to connect the motor 200 to the cylinder device 300 and also to mount the device 100 itself to the vehicle body. The cylinder body 301 is of a stepped type and includes an enlarged diameter portion 301b disposed next to the mounting flange 302 and a reduced diameter portion 301a disposed on the side of a closed end thereof. The cylinder body 301 is provided on the side of the reduced diameter portion 301a with a boss portion 301c. The inner side of the boss portion 301c is defined as an input port 303, and an output port 304 is defined at an area near to a bottom of the boss portion 301c away from the input port 303. The input port 303 is in communication with a liquid reservoir (not shown in FIG. 2), while the output port 304 is in communication with the operating cylinder 40 which is adapted to actuate the variable torque clutch 30.

Within the stepped cylinder body 301, an enlarged diameter hollow 310b and a reduced diameter hollow 310a are coaxially disposed, thereby forming a stepped cylinder hollow 310. The motor 200 is mounted on the mounting flange 302 with its output shaft 210 placed coaxial with the cylinder body 301. The output shaft 210 of the motor 200 is situated within the enlarged diameter hollow 310b. A rotational driving member 330 is connected to and around the output shaft 210. The rotational driving member 330, while being carried on a bearing 320, is rotated in accordance with the rotation of the motor 200. The rotational driving member 330 includes a threaded-shaft portion 332 and supports a rotational motion to linear motion transforming member 340 therearound. The transforming member 340 is connected to the threaded-shaft portion 332 through a ball screw mechanism (not shown) in order to transform a rotational motion of the threaded-shaft portion 332 to a linear motion (namely, stroke motion). For performing the transforming operation, the transforming member 340 is stopped rotation by a clutch mechanism 350 under a normal torque of inertia. The clutch mechanism 350 includes a stationary spring retainer 351, a movable spring retainer 352, and a clutch spring 353 supported between the spring retainers 351 and 352. Opposite end portions of the clutch spring 353 are tightly fitted respectively into the spring retainers 351 and 352. The transforming member 340 is integral with a sleeve-like member 360. A distal end of the sleeve-like member 360 is in abutment with a plunger 370. The plunger 370 is provided on an outer peripheral portion thereof with a guide ring 371 and a seal ring 372, and on one end portion thereof with a return spring 373. Therefore, the plunger 370 is brought into abutment with the sleeve-like member 360 by the return spring 373. A hydraulic pressure chamber 376 is defined within the reduced diameter hollow 310a by the seal ring 372.

When the transforming member 340 performs a linear motion (stroke motion) in accordance with the rotation of the motor 200 to cause the plunger 370 to move far into the reduced diameter hollow 310a, a shut-off valve 380 located near to the input port 303 is brought into a closed position from an open position by the plunger 370. As a consequence, a hydraulic pressure corresponding to the stroke of the plunger 370 is produced in the hydraulic pressure chamber 376 and the hydraulic pressure thus produced is supplied to the operating cylinder 40 through the output port 304. During the time when the plunger 370 is performing a predetermined amount of stroke to produce a constant hydraulic pressure within the hydraulic pressure chamber 376, a constant electric current is being supplied to the motor 200 and the motor 200 is kept stopped due to balance of force between the constant electric current being supplied to the motor 200 and a reaction caused by the hydraulic pressure acting on the plunger 370. On the other hand, when the supply of electric current to the motor 200 is cut off, the output shaft 210 of the motor 200 is allowed to be free to rotate. Therefore, the transforming member 340 is returned to its original position under the influence of the clutch spring 353 of the clutch mechanism 350 and the plunger 370 is also returned to its original position under the effect of the return spring 373. In response to this movement of the plunger 370, the shut-off valve 380 is brought again into its open position, so that the hydraulic pressure within the hydraulic pressure chamber 376 is released into the liquid reservoir.

[OPERATING CYLINDER]

Figure 3:
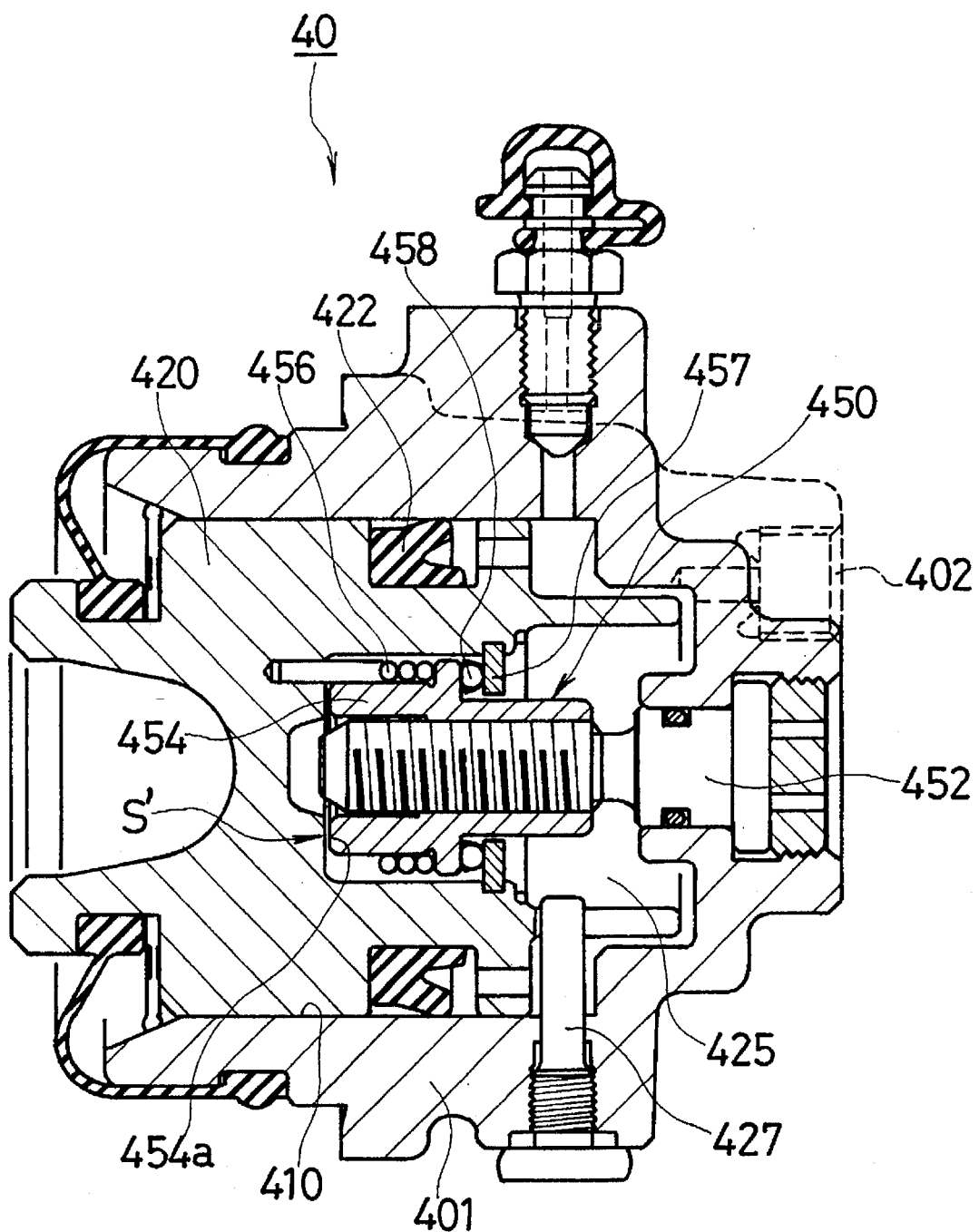
FIG. 3 is a sectional view of a construction showing one example of an operating cylinder to be employed in the present invention.

FIG. 3 shows one example of the operating cylinder 40 which receives the supply of hydraulic pressure from the hydraulic pressure supply device 100. The operating cylinder 40 will now be described with reference to FIG. 3. The operating cylinder 40 comprises a piston 420 fitted into a cylinder hollow 410 formed at a central portion of a housing 401, and an adjusting mechanism 450 for adjusting a returning position of the piston 420. The piston 420 is designed to support a seal ring 422 on its outer periphery and define a hydraulic pressure chamber 425 within the housing 401. The hydraulic pressure chamber 425 is located generally adjacent to a hydraulic pressure supply port 402. When a hydraulic pressure is supplied into the hydraulic pressure chamber 425 through the hydraulic pressure supply port 402, the piston is moved leftward in FIG. 3 so that a gain of the engagement force of the variable torque clutch device 30 is increased. On the other hand, when the hydraulic pressure within the hydraulic pressure chamber 425 is released, the piston 420 is returned rightward under the effect of the returning force of the variable torque clutch device 30 and occupies its returning position. A shaft member 427 disposed at a lower part of the housing 401 is adapted to guide the moving piston 420 and regulates the maximum retreat position of the piston 420.

However, the returning position of the piston 420 is actually adjusted by the adjusting mechanism 450. The adjusting mechanism 450 includes a threaded member 452 fixed relative to the housing 401 along an axis thereof, a sleeve-like nut member 454 threadedly engaged with the outer periphery of the threaded member 452, and an adjusting spring 456 adapted to exert a predetermined rotational force to the nut member 454 so that a constant space S' will be maintained between one end 454a of the nut member 454 and an opposing face of the piston 420. As the piston 420 is moved leftward in FIG. 3, the nut member 454 of the adjusting mechanism 450 is moved in the same direction as the piston 420 through a stopper 457 and a ball bearing 458. At that time, since the nut member 454 is threadedly engaged with the threaded member 452, the member 454 is axially rotated due to a force acting from the threaded member 452 side, so that the adjusting spring 456 will be tightened. On the other hand, when the hydraulic pressure of the hydraulic pressure chamber 425 is released to return the piston 420 rightward, the untightening adjusting spring 456 causes the nut member 454 to rotate but in the opposite direction this time, so that the threadedly engaging position is adjusted relative to the threaded member 452. As a result of this adjustment, the returning position of the piston 420 is automatically adjusted so that play, which would otherwise occur due to wear of the clutch of the variable torque clutch device 30 or the like, will not occur. Also, in order to more effectively eliminate such play and improve switching responsibility of the clutch, it is preferable that a pilot pressure is supplied to the hydraulic pressure chamber 425 of the operating cylinder 40. In this respect, there can be installed a remaining pressure valve for providing a pilot pressure, somewhere between the operating cylinder 40 and the hydraulic pressure supply device 100, as at the hydraulic pressure supply port 402 of the operating cylinder 40 or the output port 304 on the side of the hydraulic pressure supply device 100. Since the remaining pressure valve is of a simple construction, as disclosed in Japanese Utility Model Publication No. Hei 4-45970, which comprises a valve body, and a spring for exerting a load to the valve body, it can be easily installed at the port 402 or 304, for example, and even if installed, it will not complicate the construction of the hydraulic pressure control system.

[CONTROL SYSTEM]

Figure 4:
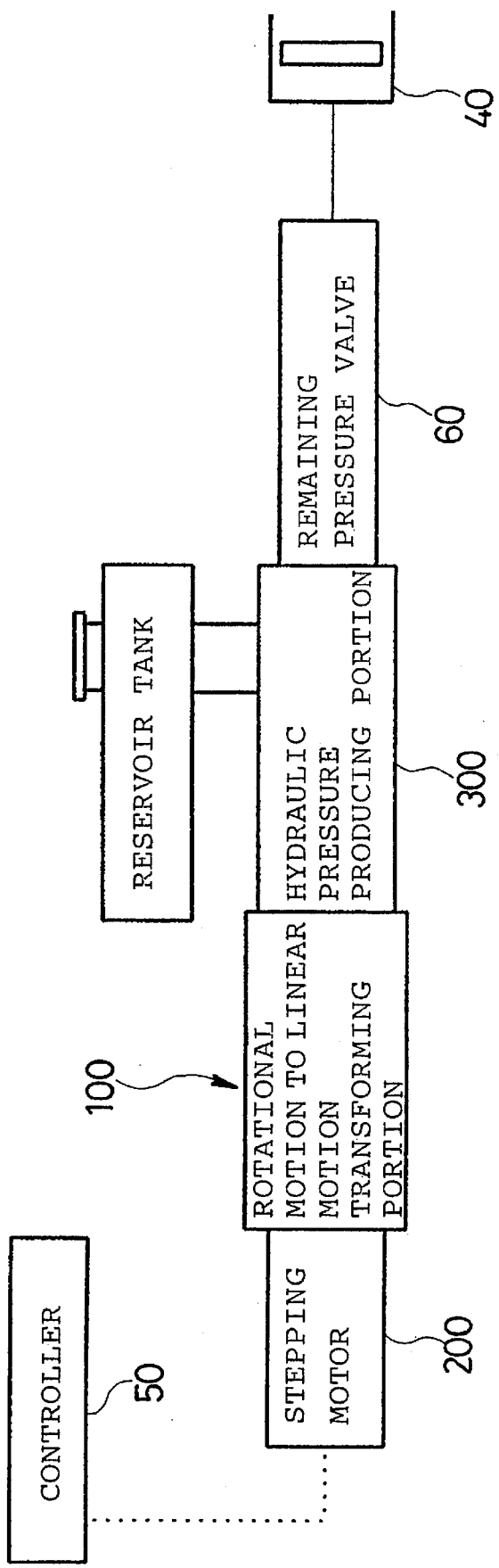
FIG. 4 is a view showing a first example of a control system.
Figure 5:
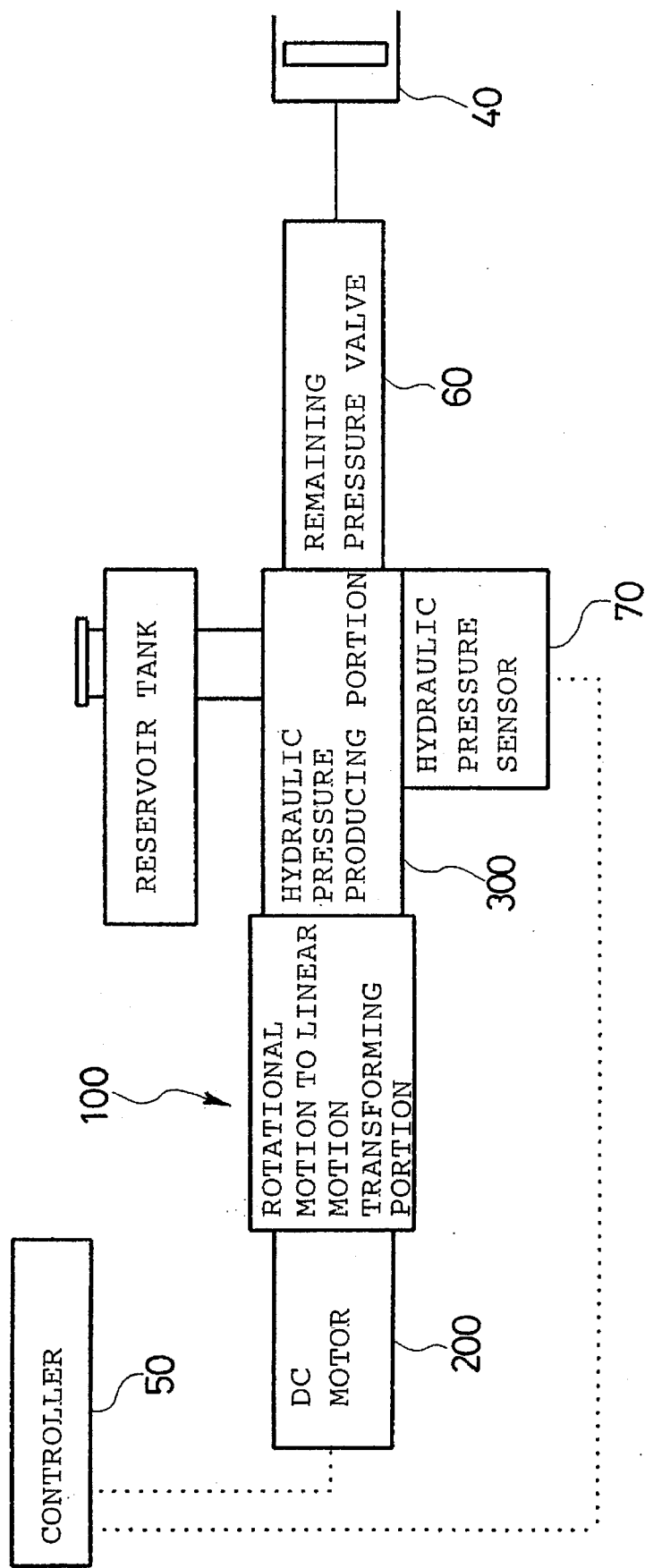
FIG. 5 is a view showing a second example of a control system.
Figure 6:
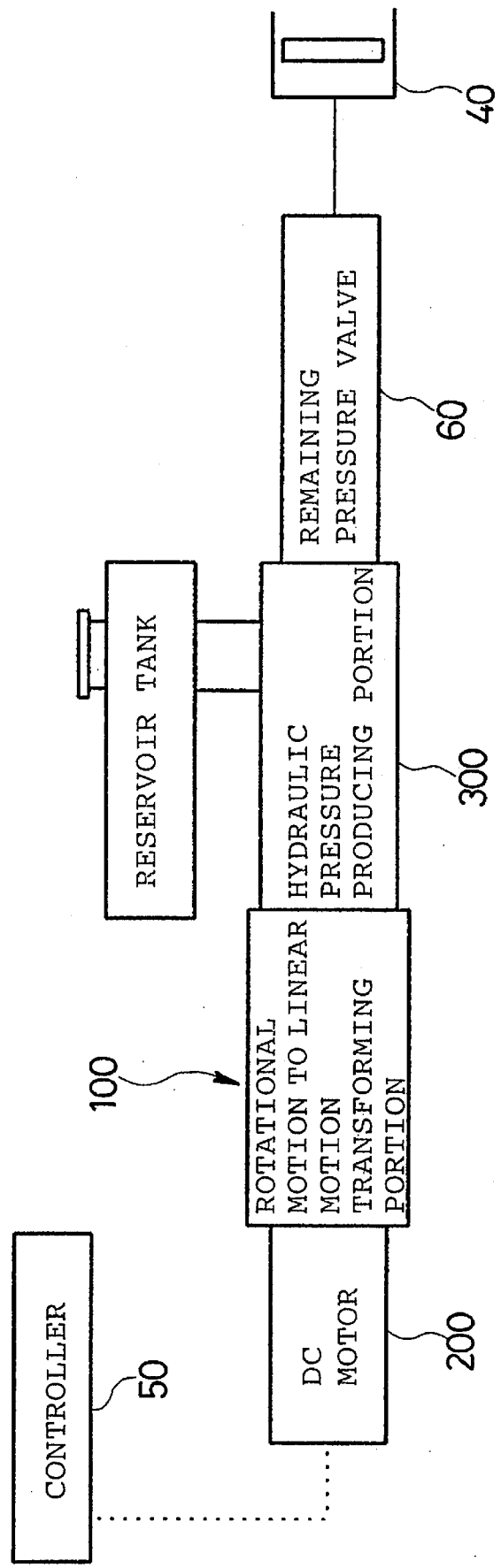
FIG. 6 is a view showing a third example of a control system.
Figure 7:
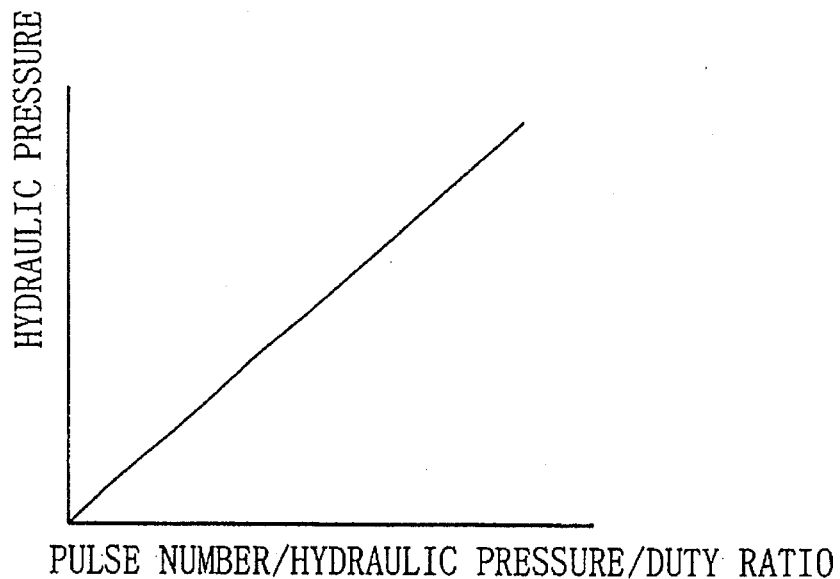
FIG. 7 is a graph showing the characteristics of a hydraulic pressure obtained in the present invention.

The hydraulic pressure supply device 100, as already mentioned, mainly comprises a motor 200, and a hydraulic pressure producing cylinder device 300. The hydraulic pressure supply cylinder device 300 portion actuated by the motor 200 can be divided into a rotational motion to linear motion transforming portion disposed within the enlarged diameter hollow 310$b$, and a hydraulic producing portion disposed within the reduced diameter hollow 310$a$. FIGS. 4 to 6 show, from this view point, three mutually different control systems among the controller 50, the hydraulic pressure supply device 100, and the operating cylinder 40. Although the control systems are mutually different, the purposes of control thereof are the same. As shown in FIG. 7, a hydraulic pressure having linear characteristics is produced within the hydraulic pressure producing portion (i.e., hydraulic pressure chamber 376). It should be noted that the respective control systems depicted in the respective Figures include a remaining pressure valve 60 for providing a pioneer pressure.

Figure 8:
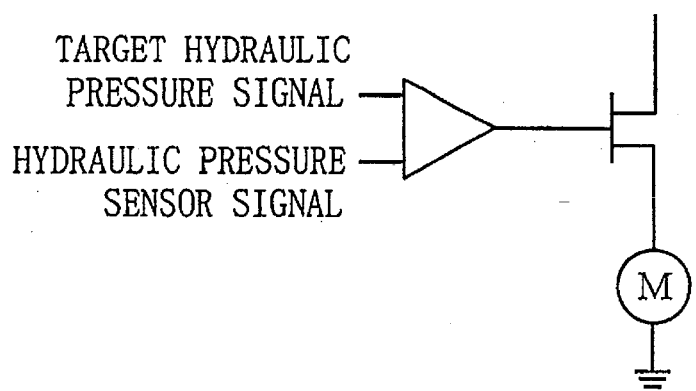
FIG. 8 is a view showing one example of a control circuit to be used in the control system of FIG. 5.

In the control system of FIG. 4, a stepping motor is used as the motor 200, and the controlling is made such that a predetermined hydraulic pressure can be obtained in accordance with the number of pulses applied to the motor 200. In the control system of FIG. 5, a DC motor is used as the motor 200, and a hydraulic pressure produced within the hydraulic pressure chamber 376 is monitored by the hydraulic pressure sensor 70 so that the hydraulic pressure thus monitored is fed back to the controller 50. For such feedback control of the hydraulic pressure, the control circuit includes, as shown in FIG. 8, a comparator 80 for comparing a target hydraulic pressure signal with a hydraulic pressure sensor signal, and a switching element 90 for ON-OFF switching a driving electric current of the motor 200 in accordance with an output of the comparator 80. At that time, the target hydraulic pressure itself is determined by the controller 50 based on information such as vehicle wheel speed.

As another control system using a DC motor as the motor 200, a duty control (see FIG. 6) for controlling the pulse width (i.e., time ratio of ON-OFF) of a motor driving current can be applied. Since the driving electric current for the motor 200 and the hydraulic pressure obtained in the hydraulic pressure producing portion of the hydraulic pressure producing cylinder device 300 are in proportional relation, there can be obtained a hydraulic pressure corresponding to the average electric current by controllably modulating the electric current supplied to the motor 200. For such duty control, the hydraulic pressure sensor 70, which is used in the hydraulic pressure feedback control, is not required, and therefore, this control system is advantageous to that extent in view of cost efficiency and reliability.

In the motor drive type hydraulic pressure producing cylinder device 300, the plunger 370 of the hydraulic pressure producing portion is returned to the non-operating position by the return spring 373. Therefore, there is a possibility that the mode cannot be switched to the four wheel drive mode when such a failure as cutting off the supply of electric current from the controller 50 should occur. As a countermeasure for such a failure as mentioned, there can be additionally employed a fail-safe controller for supplying a control electric current having a fixed duty ratio to the motor 200 upon occurrence of the failure of the controller 50.

In the hydraulic pressure producing cylinder device 300, there is a possibility of over-shoot relative to the target hydraulic pressure. Such over-shoot occurs due to thrust force which is generated by torque of inertia acting on a rotational portion of the motor 200, the ball screw mechanism or the like and received by plunger 370 even when the increase of electric current supplied to the motor 200 is stopped and the electric current becomes constant. There are following ways for lessening such over-shoot. One way is for determining the dimension of the seal diameter by the seal ring 372 so that the slide resistance of the plunger 370 with respect to the seal ring 372 offsets the thrust force caused by the torque of inertia, in the hydraulic pressure producing cylinder device 300, in other words, a way for setting a somewhat large seal diameter. For example, in the duty control procedure, the several pulses having a small width are first outputted, and then a pulse having a predetermined width is outputted.

[FIRST EMBODIMENT OF HYDRAULIC PRESSURE COMPENSATING DEVICE]

This invention relates to a technique for keeping the supply of a predetermined hydraulic pressure to the operating cylinder 40 by a hydraulic pressure compensating device when the motor 200 of the hydraulic pressure supply device 100 becomes unable to rotate.

Figure 9:
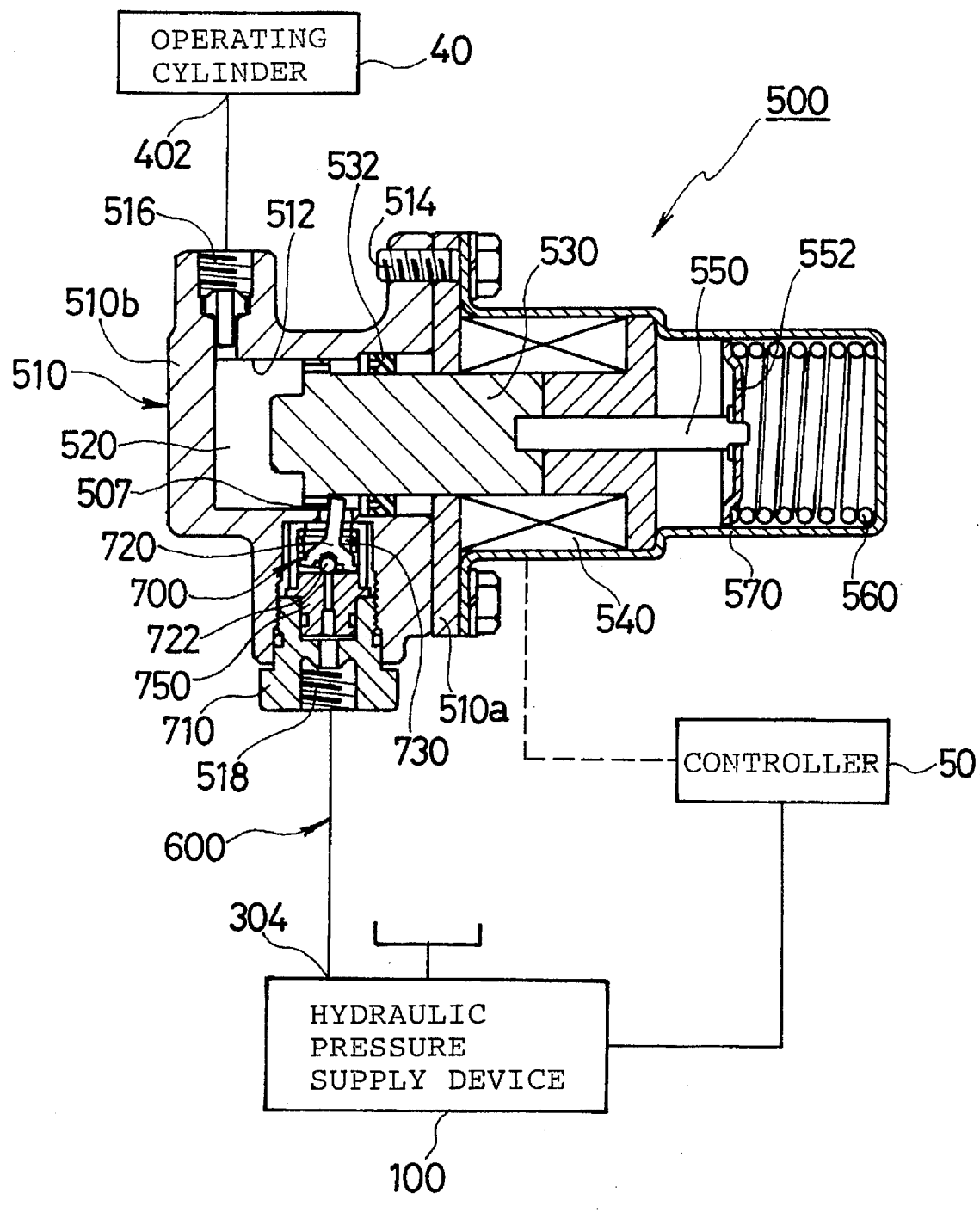
FIG. 9 is a view showing a first embodiment of a hydraulic pressure compensating device.

FIG. 9 clearly illustrates a hydraulic pressure compensating device 500 according to the first embodiment. This hydraulic pressure compensating device 500 is located in a midway of a line 600 for communicating the output port 304 of the hydraulic pressure supply device 100 and the hydraulic pressure supply port 402 of the operating cylinder 40. The hydraulic pressure compensating device 500 mainly comprises a solenoid cylinder and includes a piston 530 which defines a hydraulic pressure chamber 520 within a cylinder hollow 512 of a cylinder body 510, and a solenoid 540 which renders an electromagnetic force to the piston 530. The piston 530 receives a biasing force of a spring 560 through a rod 550 and a spring retainer 552. The spring 560 is loaded in a cup-like cover 570 together with a first cylinder portion 510$a$ of the cylinder body 510. The spring 560 is in its compressed state during a normal running condition shown in FIG. 9. Accordingly, the spring 560 exerts a biasing force to the piston 530 so that the piston is biased toward the hydraulic pressure chamber 520. However, since the electromagnetic force caused by the energized solenoid 540 is larger than the biasing force of the spring 560, the piston 530 is in a location where the volume of the hydraulic pressure chamber 520 is large, as shown in FIG. 9, during the normal (no failure) condition.

The hydraulic pressure chamber 520 is located within a second cylinder portion 510$b$ of the cylinder body 510, and is formed by the cylinder hollow 512 of the second cylinder portion 510$b$ and the piston 530, and in addition, by a seal ring 532 for sealing the outer periphery of the piston 530. The second cylinder portion 510b is formed integral with the first cylinder portion 510a by a fixing bolt 514 or the like, thereby constituting the cylinder body 510. The second cylinder portion 510b is provided with a port 518 and a stop valve 700 disposed on the input side in addition to a piping connection port 516 disposed on the output side. The stop valve 700 is located at the inner side of the housing 710 which is threadedly engaged with a boss portion of the second cylinder portion 510b, and the port 518 on the input side is located at the outer side of the housing 710. The stop valve 700 is a so-called tilting valve, which includes a poppet type valve body 720 and a conical spring 730 for exerting a biasing force to the valve body 720. This stop valve 700 is normally opened but brought to its closed position when a failure has occurred. The valve body 720 of the stop valve 700 is normally tilted pushed by a flange portion 507 of the piston 530. Because of such tilted posture of the stop valve 700, a ball 722 at a lower portion of the valve body 720 is in its open position, away from a central valve seat of a seat member 750. Accordingly, the port 518 communicating with the hydraulic pressure supply device 100 side is communicated with the hydraulic pressure chamber 520 of the hydraulic pressure compensating device 500 through the stop valve 700 and further with the operating cylinder 40 side through the port 516 which is in communication with the hydraulic pressure chamber 520.

Figure 10:
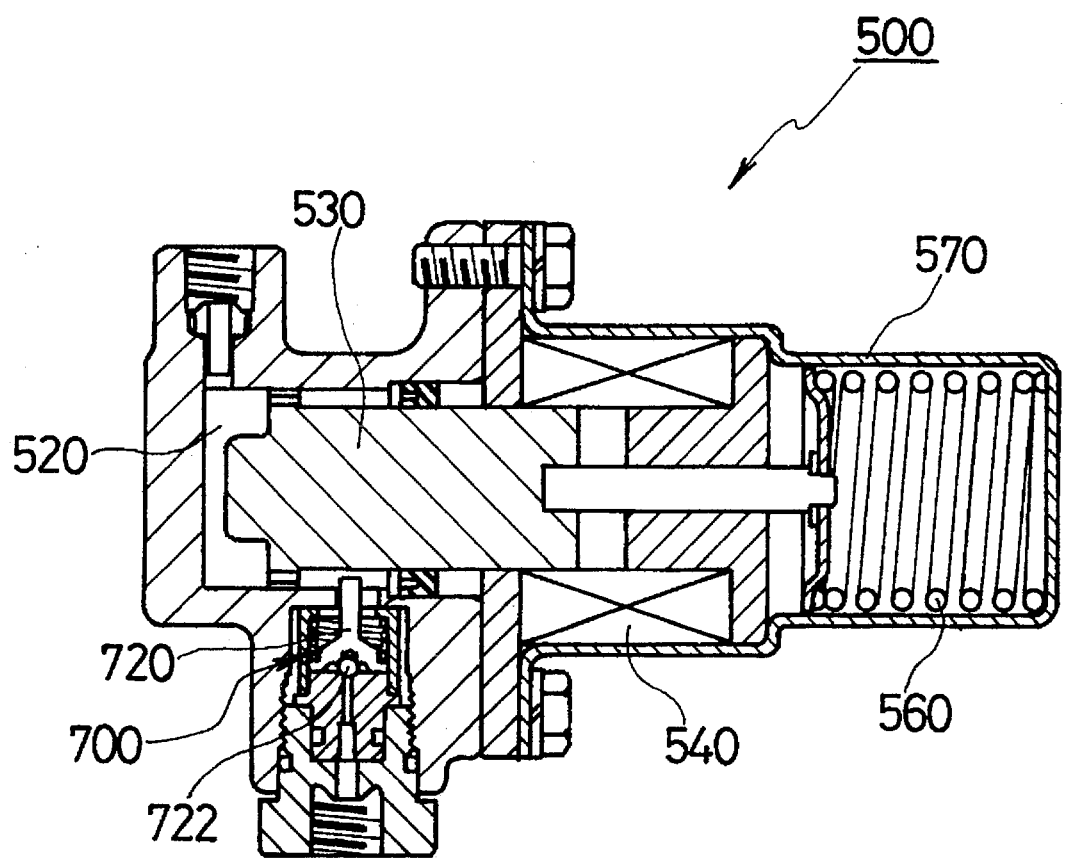
FIG. 10 is a view showing another state of the hydraulic pressure compensating device of FIG. 9.

However, the stop valve 700 is closed when a failure disenabling rotation of the motor 200 of the hydraulic pressure supply device 100 has occurred. A control signal coming from the controller 50 is applied to the solenoid 540 of the pressure cylinder 500. Upon occurrence of a failure of the type mentioned, the controller 50 sends a command for cutting off the supply of electric current to the solenoid 540. As a result, the electromagnetic force caused by the energized solenoid 540 is disappeared and the piston 530 is moved a predetermined amount toward the hydraulic pressure chamber 520 by the biasing force of the spring 560. FIG. 10 shows a state after the piston 530 has moved the predetermined amount. As apparent from FIG. 10, as the piston 530 moves, the valve body 720 of the stop valve 700 is caused to erect upwardly and the ball 722 is caused to sit on the valve seat to thereby close the stop valve 700. Also, the volume of the hydraulic pressure chamber 520 of the hydraulic pressure compensating device 500 becomes small, and a predetermined hydraulic pressure is produced in the hydraulic pressure chamber 50. The hydraulic compensating device 500, on the place of the hydraulic pressure supply device 100 in which the failure has occurred, supplies the hydraulic pressure thus produced to the operating cylinder 40 so that the torque distribution ratio with the front and rear wheels can be maintained to a predetermined level matching to a normal running condition of the vehicle.

[SECOND EMBODIMENT OF HYDRAULIC PRESSURE COMPENSATING DEVICE]

Figure 11:
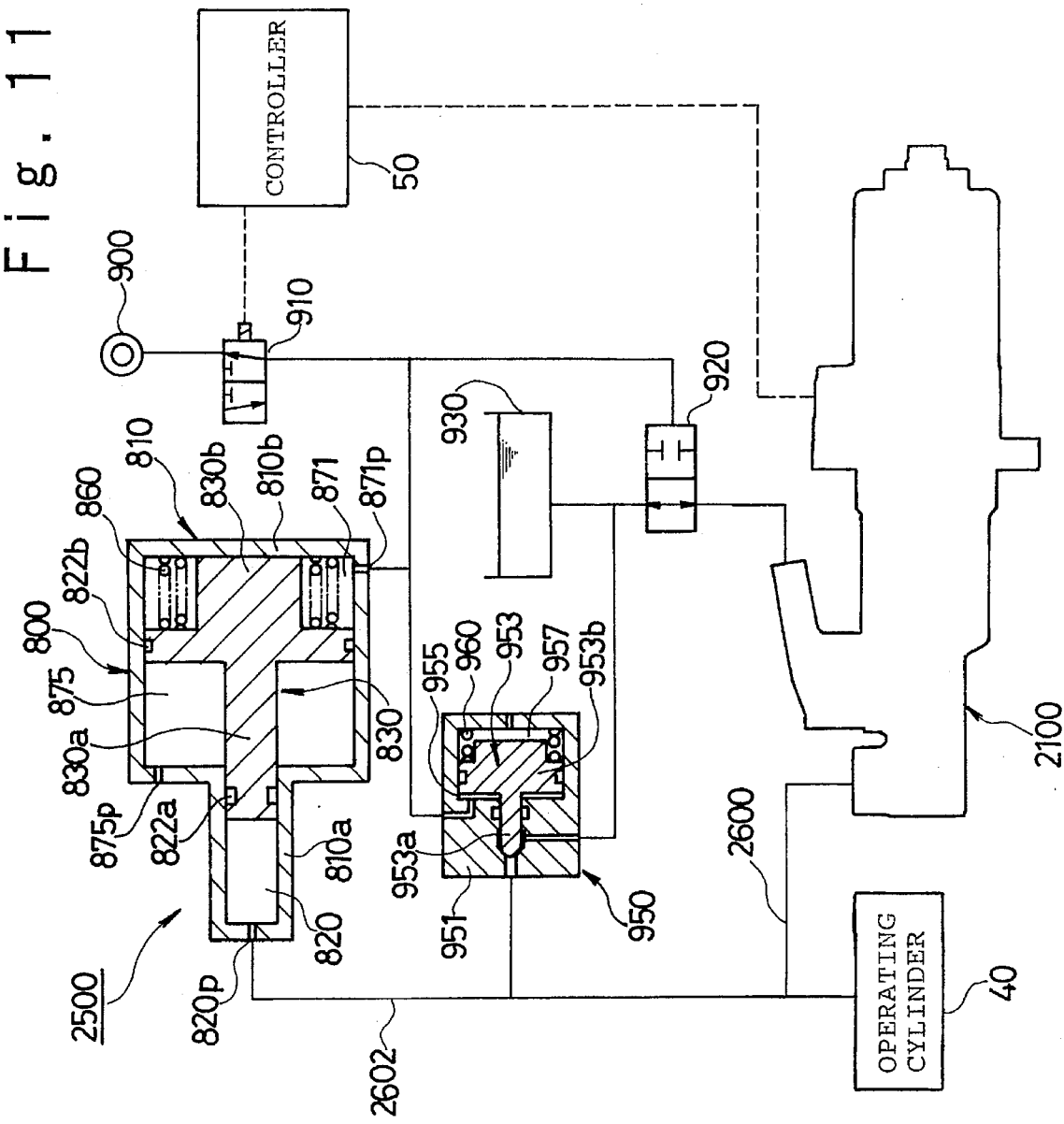
FIG. 11 is a view showing a second embodiment of a hydraulic pressure compensating device.

FIG. 11 clearly illustrates a hydraulic pressure compensating device 2500 according to the second embodiment. This hydraulic pressure compensating device 2500, unlike the first embodiment, is arranged in parallel relation to a line 2600 for communicating a hydraulic pressure supply device 2100 and an operating cylinder 40. The hydraulic compensating device 2500 of the second embodiment mainly comprises a pressure cylinder of the type in which the piston is moved depending on whether there is a differential pressure between a vacuum source and the atmosphere.

A pressure cylinder 800 comprises a cylinder body 810 including a cylinder portion 810a of a reduced diameter and a cylinder portion 810b of an enlarged diameter, a piston 830 disposed within the cylinder body 810 and adapted to define a hydraulic pressure chamber 820 therein, and a spring 860 for biasing the piston 830 toward the hydraulic pressure chamber 820. The piston 830 is of a stepped type, which includes a reduced diameter portion 830a and an enlarged diameter portion 830b. The reduced diameter portion 830a and enlarged diameter portion 830b are fitted to the corresponding cylinder portion 810a having a reduced diameter portion and cylinder portion 810b having an enlarged diameter portion of the cylinder body 810, respectively. The fitted reduced diameter portion 830a and enlarged diameter portion 830b of the piston 830 are provided with seal rings 832a and 832b, respectively, and define, within the cylinder body 810, the hydraulic pressure chamber 820 on the reduced diameter side, an atmosphere chamber 875 on the enlarged diameter side but at a front portion thereof, and a pressure transforming chamber 871 on the enlarged diameter side but at a rear portion thereof, respectively.

The hydraulic pressure chamber 820 is communicated with the operating cylinder 40 through a port 820p formed in an end portion of the cylinder portion 810a of a reduced diameter and a line 2602 connected to the port 820p. The atmosphere chamber 875 is normally in communication with the atmosphere through a port or path 875p. The pressure transforming chamber 871 is connected to an atmosphere/vacuum source switch controlling circuit which is connected to a port or path 871p, and switched to the mode of atmosphere or vacuum source by switching function of the switch controlling circuit. The pressure transforming chamber 871 also acts as a chamber for receiving the spring 860.

Reference is now made to the switch controlling circuit. The switch controlling circuit includes, in addition to a vacuum source 900 such as an intake manifold of the engine, an electromagnetic valve 910. The electromagnetic valve 910 is a three-port two-position valve which is designed to communicate the pressure transforming chamber 871 with the vacuum source 900 at the illustrated position and also to communicate the pressure transforming chamber 871 with the atmosphere at a different location not shown. In connection with the electromagnetic valve 910, there is a provision of a switch valve 920. The switch valve 920 is a two-port two-position valve. Normally, as illustrated, the switch valve 920 intercommunicates the liquid reservoir 930 and the hydraulic pressure supply device 2100. However, in response to the electromagnetic valve 910 being switched to the atmosphere releasing position, the switch valve 920 cuts off the communication between the liquid reservoir 930 and the hydraulic pressure supply device 2100. This switch valve 920 is for ensuring the effect of the function of a variable relief valve 950. The variable relief valve 950 comprises a housing 951, a stepped valve body 953 contained in the housing 951, and a valve portion formed at a distal end of a reduced diameter portion 953a of the valve body 953. The variable relief valve 950 further comprises a control chamber 955 formed between the reduced diameter portion 953a of the valve body 953 and an enlarged diameter portion 953b of the valve body 953, and an atmosphere chamber 957 formed at a rear portion of the valve body 953. The atmosphere chamber 957 also acts as a chamber for receiving a spring 960 for exerting a biasing force to the valve body 953. In response to the switching operation of the electromagnetic valve 910, the variable relief valve 950 communicates the control chamber 955 with the atmosphere or the vacuum source 900, so that the relief pressure will be varied. It should be noted that control signals coming from the controller 50 are, of course, supplied to the motor 200 of the hydraulic pressure supply device 2100 and the electromagnetic valve 910.

When the hydraulic pressure supply device 2100 is in a normal condition, the variable relief valve 950 increases the relief pressure by communicating the control chamber 955 with the vacuum source 900, so that the hydraulic pressure on the side of the operating cylinder 40 will not be released toward the liquid reservoir 930 side. The high relief pressure is a combination of the biasing force of the spring 960 and a differential pressure between the vacuum source 900 and the atmosphere. On the other hand, when a failure has occurred to the hydraulic pressure supply device 2100, the variable relief valve 950 communicates the control chamber 955 with the atmosphere so that the above-mentioned differential pressure will not occur. Therefore, the relief pressure at that time is determined by the biasing force of the spring 960, and the hydraulic pressure on the side of the operating cylinder 40 is not allowed to exceed the predetermined value. Particularly, in the case of the hydraulic supply device 2100 including a clutch mechanism, there is a possibility that an extra hydraulic pressure is supplied to the operating cylinder 40 side. In that case, however, the variable relief valve 950 undertakes the Job for releasing such extra hydraulic pressure to the liquid reservoir 930.

FIG. 12 illustrates a detailed sectional structure of the hydraulic pressure supply device 2100 including a clutch mechanism for prohibiting a return stroke of the plunger caused by the produced hydraulic pressure, in view of reducing a load to the motor. The hydraulic pressure supply device 2100 shown in FIG. 12 is also of the type in which a hydraulic pressure is obtained by transforming a rotational motion of the motor to a stroke motion of the plunger as in the case with the hydraulic pressure supply device 100 shown in FIG. 2. The hydraulic pressure supply device 2100 has many common points with the hydraulic pressure supply device 100. Therefore, for explaining the hydraulic pressure supply device 2100, like parts to those of the device 100 are denoted by like reference numerals (or corresponding reference numerals of the device 100 plus 2000), respectively, and description thereof is simplified or entirely omitted.

The hydraulic pressure supply device 2100 comprises an electric motor 2200 and a cylinder device 2300. A cylinder body 2310 of the cylinder device 2300 portion is provided with a connecting coupler 930c for communicating an input port 2303 with the liquid reservoir 930, and a piping connection portion 40c for connecting an output port 2304 with the operating cylinder 40. Rotation of the motor 2200 is transmitted to a rotational driving member 2330 which includes a threaded-shaft portion 2332, so that a rotational motion to linear motion transforming member 2340 threadedly engaged with the threaded-shaft portion 2332 is caused to perform a stroke motion in an axial direction. The rotational motion to linear motion transforming member 2340 causes a plunger 2370 to move linearly, thereby producing a hydraulic pressure in a hydraulic pressure chamber 2376. This series of operations are the same as in the case with the device 100 mentioned above.

The hydraulic pressure supply device 2100 of FIG. 12 is different from the device 100 mostly in the respects; (1) a predetermined clutch mechanism 3000, which the device 100 does not have, is located between an output shaft 2210 of the motor 2200 and the rotational driving member 2330, and (2) in the device 100, the shut-off valve 380 is used as a means for opening and closing the communication between the input port 303 and the hydraulic pressure chamber 376, whereas in the hydraulic pressure supply device 2100 here, there is employed a means for opening and closing a relief port 4000 disposed on the cylinder body 2310 based on the position of a cup seal 5000 around the plunger 2370.

The last mentioned difference (2) will be apparent to those skilled in the art. Also, the first-mentioned respect can be easily put into practice by applying a clutch mechanism disclosed, for example, in Japanese Utility Model Provisional Publication No. Hei 6-18132. The first mentioned difference (1) will be described more specifically. There is a provision of a support member 2202a between the cylinder body 2310 and the motor 2200, and a first bearing 2301 is retained on the inner periphery of the support member 2202a. A threaded ring 2204 at an opening portion of the cylinder body 2310 is adapted to fix another support member 2202b. The support member 2202b is adapted to retain a second bearing 2302. The second bearing 2302 is designed to support a cup-like end portion 2330e of the rotational drive member 2330. The clutch mechanism 3000 is located between the end portion 2330e and the output shaft 2210 of the motor 2200. The clutch mechanism 3000 mainly comprises a clutch spring 3100. Connected to the output shaft 2210 is a first transmission member 3001 which is, in turn, connected to a second transmission member 3002 which is, in turn, connected to the cup-like end portion 2330e through another spring 2331.

Figures 12A, 12B:
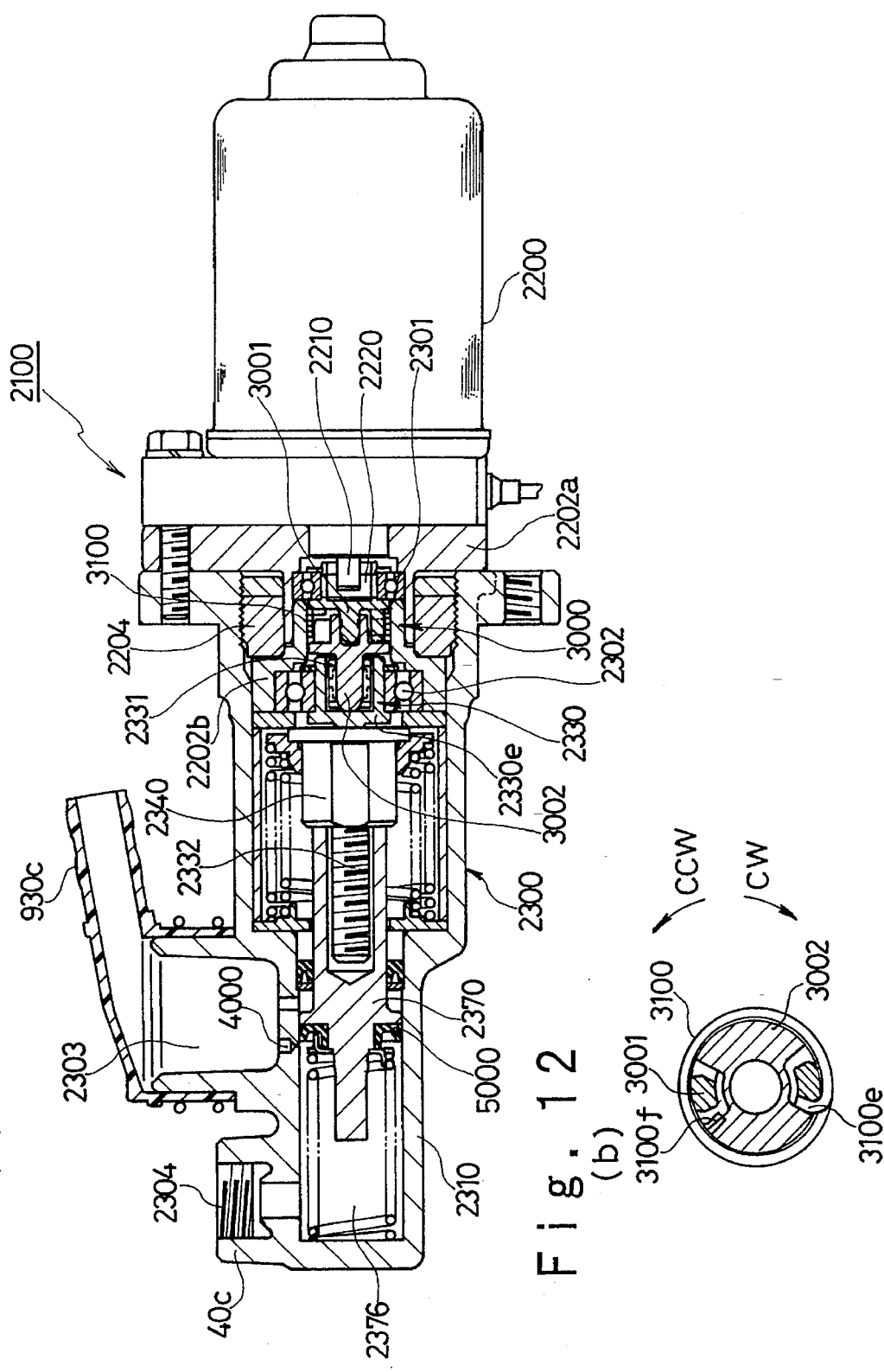
FIG. 12 shows a hydraulic pressure supply device used in connection with the second embodiment of FIG. 11, FIG. 12(*a*) is a detailed sectional view, and FIG. 12(*b*) is a view of a clutch mechanism when view from one face thereof.

As shown in FIG. 12(b), the first and second transmission members 3001 and 3002 are mutually fitted, together with opposite end portions 3100e and 3100f of the clutch spring 3100. When the motor 2200 is rotated clockwise CW, the first transmission member 3001 is rotated to push the end portion 3100e of the clutch spring 3100. By this, the clutch spring 3100 reduces its own diameter in order to remove its frictional abutment with the support member 2202b. As a consequence, the clutch spring 3100 transmits the rotation of the first transmission member 3001 side to the second transmission member 3002 through the end portion 3100e, and then causes the plunger 2370 to perform a stroke motion through the spring 2331 and the rotational driving member 2330. Similarly, when the motor 2200 is rotated counterclockwise CCW, the first transmission member 3001 pushes the other end portion 3100f of the clutch spring 3100. By this, the clutch spring 3100 reduces its own diameter in order to remove its frictional abutment with the support member 2202b. As a consequence, the rotation of the first transmission member 3001 is transmitted to the second transmission member 3002 side to cause the plunger 2370 to perform a return stroke.

On the other hand, when the second transmission member 3002 is about to rotate counterclockwise CCW by the hydraulic pressure produced in the hydraulic pressure chamber 2376 and the force of the return spring 2373, the second transmission member 3002 pushes the end portion 3100e of the clutch 3100 in order to enlarge the diameter of the clutch spring 3100. As a consequence, the clutch spring 3100 increases its frictional abutment force with the support member 2202b and therefore, the first transmission member 3001 is not rotated in spite of its receipt of a rotational force from the second transmission member 3002. As apparent from this, with respect to the rotation on the motor 2200 side, the clutch mechanism 3000 transmits both the clockwise CW and counterclockwise CCW rotations toward the rotational driving member 2330 side, but with respect to the rotation from the rotational driving member 2330 side to the motor 2200 side, the clutch mechanism 3000 prohibits the transmission of the counterclockwise CCW rotation. A static force of each part around the clutch mechanism 3000 is obtained by the clutch spring 3100 being frictionally abutted with the support member 2202b. The spring 2331 within the end portion 2330e is also served as another clutch mechanism. Even if the motor 2200 is rotated after the rotational motion to linear motion transforming member 2340 comprising a nut has returned to the illustrated non-operating position, the spring 2331 undertakes a task for idly rotate the second transmission member 3002 relative to the end portion 2330e. There is a provision of the coupler 2220 at the end of the output shaft 2210 of the motor 2200. This coupler 2220 is fitted to the first transmission member 3001 with a clearance formed in a direction normal to the surface of the paper of FIG. 12. The coupler 2220 functions to transmit the rotation between the output shaft 2210 and the first transmission member 3001 and to absorb a positional displacement of the axis of the output shaft 2210 relative to the axis of the first transmission member 3001.

In addition to the illustrated embodiments, the present invention may employ the pressure cylinder 800 of the type utilizing a vacuum (see FIG. 6) in combination with the hydraulic pressure supply device 100 equipped with no clutch mechanism (see FIG. 6). Also, the solenoid cylinder shown in FIG. 4 may be used in combination with the relief valve 950 shown in FIG. 5.

Furthermore, the solenoid cylinder may be of the type in which a spring is mechanically held in a compressed state by a lock mechanism during a normal condition, and when a failure has occurred, an electric current is temporarily supplied to a solenoid to unlock the lock mechanism so that the spring is released from its compressed state, thereby causing a plunger or a piston to perform a stroke motion.

What is claimed is:

1. A driving force distribution control system for a four wheel drive vehicle comprising a variable torque clutch device located on a driving force transmission path leading from an engine to front or rear wheels, an operating cylinder to which a hydraulic pressure is supplied so that a gain of an engagement force of said variable torque clutch device can be controlled, a hydraulic pressure supply device for supplying a hydraulic pressure to said operating cylinder in accordance with a command from outside, wherein said hydraulic pressure supply device includes a motor, rotation of which is controlled upon receipt of a command from outside, and a hydraulic pressure producing cylinder device for producing a hydraulic pressure by a stroke motion thereof in accordance with rotation of said motor, said hydraulic pressure producing cylinder device being in connection with said operating cylinder and a remaining pressure valve located between said hydraulic pressure producing cylinder device and said operating cylinder and adapted to maintain a predetermined pressure on the side of said operating cylinder when the pressure in said hydraulic pressure producing cylinder is released.

2. The driving force distribution control system of claim 1 in which said operating cylinder includes a piston which is moved in a direction for increasing the gain of the engagement force of said variable torque clutch device upon receipt of a hydraulic pressure from said hydraulic pressure producing cylinder device, and an adjusting mechanism for adjusting a returning position of said piston when said piston has moved in said direction more than a predetermined amount.

3. A driving force distribution control system for a four wheel drive vehicle comprising a variable torque clutch device located on a driving force transmission path leading from an engine to front or rear wheels, an operating cylinder to which a hydraulic pressure is supplied so that a gain of an engagement force of said variable torque clutch device can be controlled, and a hydraulic pressure supply device for supplying a hydraulic pressure to said operating cylinder in accordance with a command from outside, wherein said hydraulic pressure supply device includes a motor, rotation of which is controlled upon receipt of a command from outside, and a hydraulic pressure producing cylinder device for producing a hydraulic pressure by a stroke motion thereof in accordance with rotation of said motor, said hydraulic pressure producing cylinder device being in connection with said operating cylinder and said hydraulic pressure supply device exhibits linear control characteristics between a control variable and a produced hydraulic pressure.

4. The driving force distribution control system of claim 3, in which said hydraulic pressure supply device includes a hydraulic pressure sensor for detecting a hydraulic pressure produced by said hydraulic pressure producing cylinder device, and controllably drives said motor by feeding back a detection signal outputted from said hydraulic pressure sensor.

5. A driving force distribution control system for a four wheel drive vehicle comprising a variable torque clutch device located on a driving force transmission path leading from an engine to front or rear wheels, a hydraulic pressure supply device including a motor, rotation of which is controlled in accordance with a command from outside and adapted to produce a hydraulic pressure by transforming a rotational motion of said motor to a stroke motion of a plunger, and an operating cylinder for controlling a gain of an engagement force of said variable torque clutch device in accordance with a hydraulic pressure delivered from said hydraulic pressure supply device, wherein said driving force distribution control system further comprises a hydraulic pressure compensating device for supplying, when a failure has occurred disenabling rotation of said motor of said hydraulic pressure supply device, a predetermined hydraulic pressure to said operating cylinder in response to said failure and maintaining the pressure level.

6. The driving force distribution control system of claim 5, in which said hydraulic pressure compensating device comprises a pressure cylinder including a piston and a hydraulic pressure chamber defined by said piston and communicating with said operating cylinder, said piston being moved a predetermined amount from a non-operating position toward said hydraulic pressure chamber side when said failure has occurred.

7. The driving force distribution control system of claim 6, in which said pressure cylinder is of the type driven by a spring, and which further comprises a spring for biasing said piston toward said hydraulic pressure chamber side, and a holding means for providing a holding force enough to hold said piston in said non-operating position.

8. The driving force distribution control system of claim 7, in which said pressure cylinder is a solenoid cylinder, and said holding force of said holding means is based on an electromagnetic force.

9. The driving force distribution control system of claim 7, in which said pressure cylinder is of the type for moving said piston depending on whether there is a differential pressure between a vacuum source and the atmosphere, and the holding force of said holding means is based on a differential pressure between said vacuum source and the atmosphere.

10. The driving force distribution control system of claim 5, in which said failure disenabling the rotation of said motor includes not only a failure of the type disenabling the supply of electric current to said motor due to wire cutting or the like, but also a failure of the type in which an electric current can be supplied to said motor but said motor is unable to rotate in spite of the supply of electric current.

11. The driving force distribution control system of claim 5, in which said hydraulic pressure supply device includes a clutch mechanism for prohibiting said plunger from performing a return stroke while rotating said motor by receiving a produced hydraulic pressure during the time no electric current is being supplied to said motor, and said hydraulic pressure compensating device includes a relief valve which is opened when the hydraulic pressure to be supplied to said operating cylinder exceeds a predetermined value, so that said operating cylinder is communicated with a liquid reservoir.

12. A driving force distribution control system for a four wheel drive vehicle comprising a variable torque clutch device located on a driving force transmission path leading from an engine to front or rear wheels, an operating cylinder to which a hydraulic pressure is supplied so that a gain of an engagement force of said variable torque clutch device can be controlled, a hydraulic pressure supply device for supplying a hydraulic pressure to said operating cylinder in accordance with a command from outside, wherein said hydraulic pressure supply device includes a motor, rotation of which is controlled upon receipt of a command from outside, and a hydraulic pressure producing cylinder device for producing a hydraulic pressure by a stroke motion thereof in accordance with rotation of said motor, said hydraulic pressure producing cylinder device being in connection with said operating cylinder said operating cylinder includes a piston which is moved in a direction for increasing the gain of the engagement force of said variable torque clutch device upon receipt of a hydraulic pressure from said hydraulic pressure producing cylinder device, and an adjusting mechanism for adjusting a returning position of said piston when said piston has moved in said direction more than a predetermined amount.

\* \* \* \* \*